United States Patent
Yao et al.

(10) Patent No.: US 12,175,633 B1
(45) Date of Patent: Dec. 24, 2024

(54) METHOD OF ENHANCING ABNORMAL AREA OF GROUND-PENETRATING RADAR IMAGE BASED ON HYBRID-SUPERVISED LEARNING

(71) Applicant: Chengdu University of Technology, Chengdu (CN)

(72) Inventors: Guangle Yao, Chengdu (CN); Honghui Wang, Chengdu (CN); Wenlong Zhou, Chengdu (CN); Wei Zeng, Chengdu (CN); Chen Wang, Chengdu (CN); Ruijia Li, Chengdu (CN); Xiaoyu Xu, Chengdu (CN); Jun Li, Chengdu (CN); Siyuan Sun, Chengdu (CN)

(*) Notice: Subject to any disclaimer, the term of this patent is extended or adjusted under 35 U.S.C. 154(b) by 0 days.

(21) Appl. No.: 18/763,894

(22) Filed: Jul. 3, 2024

(30) Foreign Application Priority Data

Jul. 7, 2023 (CN) .......................... 202310830951.0

(51) Int. Cl.
G06T 5/60 (2024.01)
G01S 13/88 (2006.01)
(Continued)

(52) U.S. Cl.
CPC ............. G06T 5/60 (2024.01); G01S 13/885 (2013.01); G06T 5/50 (2013.01); G06T 11/00 (2013.01);
(Continued)

(58) Field of Classification Search
None
See application file for complete search history.

(56) References Cited

U.S. PATENT DOCUMENTS

2019/0147583 A1 5/2019 Lee et al.
2019/0355103 A1* 11/2019 Baek .................. G06T 5/60
(Continued)

FOREIGN PATENT DOCUMENTS

| CN | 106951919 A | 7/2017 |
|---|---|---|
| CN | 110163235 A | 8/2019 |

(Continued)

OTHER PUBLICATIONS

Bofeng Chen, The Research of Deep Learning based Graph Anomaly Detection, China's Outstanding Master's Degree Thesis Full-text Database Basic Science Series, Issue 12, Dec. 15, 2022, pp. A002-A81.

(Continued)

*Primary Examiner* — Yanna Wu
(74) *Attorney, Agent, or Firm* — Novoclaims Patent Services LLC; Mei Lin Wong

(57) ABSTRACT

A method of enhancing an abnormal area of a ground-penetrating radar image based on hybrid-supervised learning includes the steps of: building a database including a real image set, a simulation image set and a simulation image label set; adopting a generative adversarial network; processing semi-supervised training and unsupervised training alternately to obtain a trained model, then inputting a real radar image with abnormal area that needs to be enhanced into the model and processing through the generative network to output an abnormal-area-enhanced image. The method overcomes the problems of differences in characteristics between simulated images and real images, and low utilization efficiency of real image information by unsupervised methods, and improves the utilization efficiency of the enhanced network for real image information, the saliency of abnormal areas on real images, and the generalization ability of the enhanced network, therefore effectively (Continued)

enhances the significance of abnormal areas in ground-penetrating radar images.

4 Claims, 6 Drawing Sheets

(51) Int. Cl.
   *G06T 5/50* (2006.01)
   *G06T 11/00* (2006.01)
(52) U.S. Cl.
   CPC .............. *G06T 2207/20081* (2013.01); *G06T 2207/20084* (2013.01)

(56) References Cited

U.S. PATENT DOCUMENTS

| | | | |
|---|---|---|---|
| 2019/0369191 A1 | 12/2019 | Gong et al. | |
| 2023/0177812 A1 | 6/2023 | Li | |
| 2024/0096017 A1* | 3/2024 | Gao | G06T 15/04 |

FOREIGN PATENT DOCUMENTS

| | | |
|---|---|---|
| CN | 112989710 A | 6/2021 |
| CN | 113537031 A | 10/2021 |
| CN | 114005075 A | 2/2022 |
| CN | 115345790 A | 11/2022 |
| CN | 115600663 A | 1/2023 |
| CN | 115601572 A | 1/2023 |
| CN | 116012255 A | 4/2023 |
| CN | 116091331 A | 5/2023 |

OTHER PUBLICATIONS

Qiuming Wang, Research on quality enhancement methods for radar detection data at urban intersections, China's Outstanding Master's Degree Thesis Full-text Database Engineering Technology II, Issue 3, Mar. 15, 2023, pp. C034-C562.

Yongmin Liu, Yujin Yang, Haoyi Luo, Hao Huang, Tieqiang Xie, Intrusion detection method for wireless sensor network based on bidirectional circulation generative adversarial network, Journal of Computer Applications, May 9, 2022, pp. 1-10.

Wonsup Shin, Seok-Jun Bu and Sung-Bae Cho, 3D Convolutional Neural Network with Generative Adversarial Network and Autoencoder for Robust Anomaly Detection in Video Surveillance, International Journal of Neural Systems, vol. 30 Issue 6, Dec. 31, 2020, pp. 2020034-1-15, World Scientific Publishing Company.

D Deepa et al., ESSR-GAN: Enhanced super and semi supervised remora resolution based generative adversarial learning framework model for smartphone based road damage detection, Multimedia Tools and Applications, May 30, 2023, pp. 1-31.

* cited by examiner (a)

(b)

(c)

METHOD OF ENHANCING ABNORMAL AREA OF GROUND-PENETRATING RADAR IMAGE BASED ON HYBRID-SUPERVISED LEARNING

CROSS REFERENCE OF RELATED APPLICATION

This is a non-provisional application that claims priority to Chinese application number 2023108309510, filing date Jul. 7, 2023, the entire contents of which are expressly incorporated herein by reference.

BACKGROUND OF THE PRESENT INVENTION

Field of Invention

The present invention relates to an image enhancement method, and in particularly related to a method of enhancing abnormal area in ground-penetrating radar image based on hybrid-supervised learning.

Description of Related Arts

As the scale of infrastructure construction such as various urban traffic roads and underground traffic projects increases year by year, the maintenance of urban roads urgently requires high-efficiency and highly intelligent means. Compared with methods such as drill core sampling, manual observation, and excavation sampling based on underground sampling, ground-penetrating radar surveying is widely used in the fields of urban road surveying etc. because of its non-destructive, efficient, continuous detection, and intuitive image characteristics.

However, when using ground-penetrating radar to detect underground abnormal areas on highways, the collected signals not only include the response of the target, but also include unnecessary noise from antenna coupling in the air and soil, system vibration and soil reflection, and interferences form power frequency interference, software processing and etc. These problems lead to severe noise interference in radar images, unclear target features, and affect the subsequent detection of road abnormal areas. In particular, ground-penetrating radar imaging results are often affected by uneven changes in the underground medium, a large amount of random noise received in echo signals, and power frequency interference, etc., resulting in problems of weak significance of abnormal areas and low image signal-to-noise ratio etc. in ground-penetrating radar images, which ultimately affect the interpretation of abnormal areas.

Therefore, it is necessary to seek intelligent image enhancement algorithms to reduce image noise interference while ensuring that the characteristics of abnormal areas are highly significant, and ultimately enhance the significance of abnormal areas in ground-penetrating radar images, which is particularly important for subsequent detection work.

Ground penetrating radar image enhancement can start from two aspects: abnormal area saliency enhancement and image denoising. Previous researchers used methods based on end-to-end convolutional neural networks for optical image enhancement, and achieved better results than traditional filtering, matrix decomposition and other algorithms. On this basis, Li et al. used a visual attention mechanism to combine with the potential visual features of abnormal areas in ground-penetrating radar images to generate highly salient abnormal area images. However, these methods often use simulation images as labels when training deep learning network models. Also, there are differences in features between simulation images and real images and inconsistent spatial distribution, which ultimately affects the enhancement performance of the network model for real images. In addition, unsupervised learning methods have low efficiency in utilizing real image information, which further affects the performance of the network model.

For the field of ground penetrating radar image denoising, the latest algorithms use self-supervised methods or blind denoising self-supervised methods which utilize raw data to generate labels for training the denoising network. However, due to the lack of matching data, most of the deep learning denoising methods are developed for non-blind Gaussian noise. The single noise method cannot effectively remove multiple noise interference in real ground penetrating radar images while the blind denoising method based on masking cannot well reconstruct the abnormal area characteristics of the masked position, so the needs of ground penetrating radar image denoising. cannot be effectively fulfilled.

SUMMARY OF THE PRESENT INVENTION

An object of the present invention is to provide a method of enhancing an abnormal area of a ground-penetrating radar image based on hybrid-supervised learning that solves the above problems and can enhance the significance of abnormal area in ground penetrating radar image.

In order to achieve the above objects, the technical solution adopted by the present invention is as follows: a method of enhancing an abnormal area of a ground-penetrating radar image based on hybrid-supervised learning, which comprises the following steps:

(1) Building a dataset for a database:

Acquire a large number of ground penetrating radar real images, and process simulation to generate a large number of simulation images. Both the real images and the simulation images comprises one or more abnormal areas. Enhance the abnormal area manually for each of the simulation images to obtain a simulation image label, and construct a simulation label pair with the simulation image and the corresponding simulation image label.

Construct a real image set $I_{real}$ with all the real images, construct a simulation image set $I_{syn}$ with all the simulation images, and construct a simulation image label set $L_{syn}$ with all the simulation image labels.

(2) Constructing a hybrid-supervised double-loop enhancement network:

The hybrid-supervised double-loop enhancement network adopts a generative adversarial network, which comprises a generative network and an adversarial network.

(3) Training the hybrid-supervised double-loop enhancement network:

(31) Collect one batch of samples from the database, which includes N number of real images, N number of simulation images, and N number of simulation image labels corresponding to the simulation images.

(32) Processing semi-supervised training with the samples from this batch:

Input the N number of simulation images, and for each simulation image, extract its latent code, and send the latent code with its corresponding simulation image together to the generative network to obtain a first enhanced image.

Then, input the N number of real images and the N number of first enhanced images as negative samples, and the N number of simulation image labels as positive samples to the adversarial network, which will output the binary classification judgment results of whether the images are enhanced or not for each of the input samples respectively. There is a total of 3*N number of judgment results.

Calculate a loss function $L^{ss}$ of the semi-supervised training. By using a back propagation algorithm and process through $L^{ss}$, network weight parameters during the semi-supervised training are updated. The network weight parameters refer to weight parameters of the generative network, encoder, and adversarial network related to semi-supervised learning.

(33) Processing unsupervised training with the samples from this batch:

Input the N number of real images, and for each real image, extract its latent code and send its latent code together with the corresponding real image to the generative network to obtain a second enhanced image.

Then input the N number of second enhanced images and the N number of simulation images as negative samples, and the N number of simulation image labels as positive samples to the adversarial network through which the binary classification judgment results of whether the images are enhanced for each of the input samples are output respectively. There is a total of 3N number of judgment results.

Calculate a loss function $L^{us}$ of unsupervised training. By using a back propagation algorithm and processing through $L^{us}$, network weight parameters during the unsupervised training are updated. The network weight parameters refer to weight parameters of the generative network, encoder, and adversarial network related to unsupervised learning.

(34) Sequentially collecting samples by batches from the database, repeating steps (32)-(33), and obtaining a trained model.

(4) Obtaining and inputting a real radar image having an abnormal area that needs to be enhanced into the model obtained in step (34), processing through the generative network to output an abnormal area-enhanced image.

Preferably, the simulation image is generated by using GPR forward modeling to simulate underground abnormal areas of different types and morphological characteristics.

Preferably, in the step (32), the loss function $L^{ss}$ of the semi-supervised training is calculated by using the following formula:

$$L^{ss} = \lambda_{ss}(L_{pic}^{ss} + L_{lc}^{ss} + L_d^{ss}) \quad (1)$$

In the formula (1), $L_{lc}^{ss}$ refers to the loss function of the latent code during semi-supervised training, $L_{pic}^{ss}$ refers to the image loss function between the simulation image and the first enhanced image, $L_d^{ss}$ refers to the adversarial loss function of the generative adversarial network during the semi-supervised training, $\lambda_{ss}$ refers to the loss function coefficient during the semi-supervised training.

In the step (33), the loss function $L^{us}$ of unsupervised training is calculated by using the following formula:

$$L^{us} = \lambda_{us}(L_d^{us} + L_{lc}^{us}) \quad (2)$$

In the formula (2), $L_{lc}^{us}$ refers to the loss function of the latent code during the unsupervised training, $L_d^{us}$ refers to the adversarial loss function of the generative adversarial network during the unsupervised training, $\lambda_{us}$ refers to the loss function coefficient during the unsupervised training.

Preferably, $L_{pic}^{ss}$, $L_{lc}^{ss}$, $L_d^{ss}$, $L_d^{us}$, $L_{lc}^{us}$ are respectively obtained by the following formulas:

$$L_{lc}^{ss} = \frac{1}{N}\sum_{j \in N} E(i_{syn}^j)\log\frac{E(i_{syn}^j)}{E(G(i_{syn}^j))} \quad (3)$$

$$L_{pic}^{ss} = \frac{1}{N}\sum_{j \in N}\left|l_{syn}^j - G(i_{syn}^j)\right| \quad (4)$$

$$L_d^{ss} = \frac{1}{N}\sum_{j \in N}\left[(0 - D(i_{real}^j))^2 + (0 - D(G(i_{syn}^j)))^2 + (1 - D(l_{syn}^j))^2\right] \quad (5)$$

In the formula (3), $i_{syn}$ refers to the j-th number of image of the N number of simulation images, $E(i_{syn}^j)$ refers to the latent code of $i_{syn}^j$ obtained through the encoder, $G(i_{syn}^j)$ refers to the first enhanced image obtained from $E(i_{syn}^j)$ and $i_{syn}^j$ being processed together through the generative network, $E(G(i_{syn}^j))$ refers to the latent code of $G(i_{syn}^j)$ obtained through the encoder, j=1~N.

In the formula (4), syn refers to the j-th number of image label of the N number of simulation image labels.

In the formula (5), D( ) refers to the adversarial network, $D(i_{real}^j)$, $D(G(i_{syn}^j))$, $D(l_{syn}^j)$ refers to the respective binary classification judgment results of $i_{real}^j$, $G(i_{syn}^j)$, $l_{syn}^j$ obtained through adversarial network.

$$L_{lc}^{us} = \frac{1}{N}\sum_{j \in N} E(i_{real}^j)\log\frac{E(i_{real}^j)}{E(G(i_{real}^j))} \quad (6)$$

$$L_d^{us} = \frac{1}{N}\sum_{j \in N}\left[(0 - D(i_{syn}^j))^2 + (0 - D(G(i_{real}^j)))^2 + (1 - D(l_{syn}^j))^2\right] \quad (7)$$

In the formula (6), $i_{real}^j$ refers to the j-th number of image of the N number of real images, $E(i_{real}^j)$ refers to the latent code of $i_{real}^j$ obtained through the encoder, $G(i_{real}^j)$ refers to the second enhanced image obtained from $E(i_{real}^j)$ and $i_{real}^j$ real being processed together through the generative network, E(G(ideal)) refers to the latent code of $G(i_{real}^j)$, obtained through the encoder.

In the formula (7), $D(i_{syn}^j)$, $D(G(i_{real}^j))$, $D(l_{syn}^j)$ refers to the respective binary classification judgment results of $l_{syn}^j$, $G(i_{real}^j)$, $l_{syn}^j$ obtained through the adversarial network.

Regarding the terminology of latent code: its English is latent code.

Compared with the existing arts, the advantageous effect of the present invention is: as follows:

Aiming at the problems that there are differences in features between simulation images and real images, and that unsupervised methods use real image information inefficiently, a method for enhancing the saliency of abnormal areas of a ground-penetrating radar image based on hybrid supervised learning is provided. This method only uses a generative adversarial network to serve as a hybrid supervised double-loop enhancement network, and carries out training alternately in a semi-supervised and unsupervised manner.

In semi-supervised training, simulation images and simulation image labels are used to supervise the generative network to allow the model to learn the distribution of simulation images, thus having certain enhancement capabilities. Then using real images as adversarial negative samples and simulation image labels as adversarial positive samples to train the adversarial network to achieve the migration of the model from simulated enhanced distribution to real enhanced distribution.

In unsupervised training, real images are used as input, simulation images are used as adversarial negative samples, and simulation image labels are used as adversarial positive samples to process unsupervised training of the generative network, thus allowing the network to learn the real enhancement distribution, thereby allowing the model to learn saliency enhancement under real images.

Then a semi-supervised training and an unsupervised training are combined. For semi-supervised training, the data distribution of the hybrid supervised double-loop enhancement network is mainly learned from the simulation enhancement data set, and real images are used for data distribution migration to ensure that the model also has certain enhancement capabilities for real data. For unsupervised training, the data distribution of the hybrid supervised double-loop enhancement network uses real images as input and simulation image labels as adversarial samples, and are obtained through gradient backpropagation of the adversarial network, that is, the enhancement network processes unsupervised learning from real images. In the present invention, the semi-supervised training and unsupervised training are alternately processed for training. By performing constraint training in two directions, and processing multi-batch training, the model of the present invention is finally obtained. The model can be used to enhance abnormal areas in ground-penetrating radar images.

In summary, the present invention improves the utilization efficiency of the enhanced network for real image information, improves the saliency of abnormal areas on real images to enhance the generalization ability of the enhanced network, and can effectively enhance the significance of abnormal areas in ground-penetrating radar images. Compared with mainstream generative models, this method has achieved an improvement of approximately 0.09 in the objective index of image similarity on ground-penetrating radar simulation enhanced data.

DETAILED DESCRIPTION OF THE PREFERRED EMBODIMENT

Figure 1:
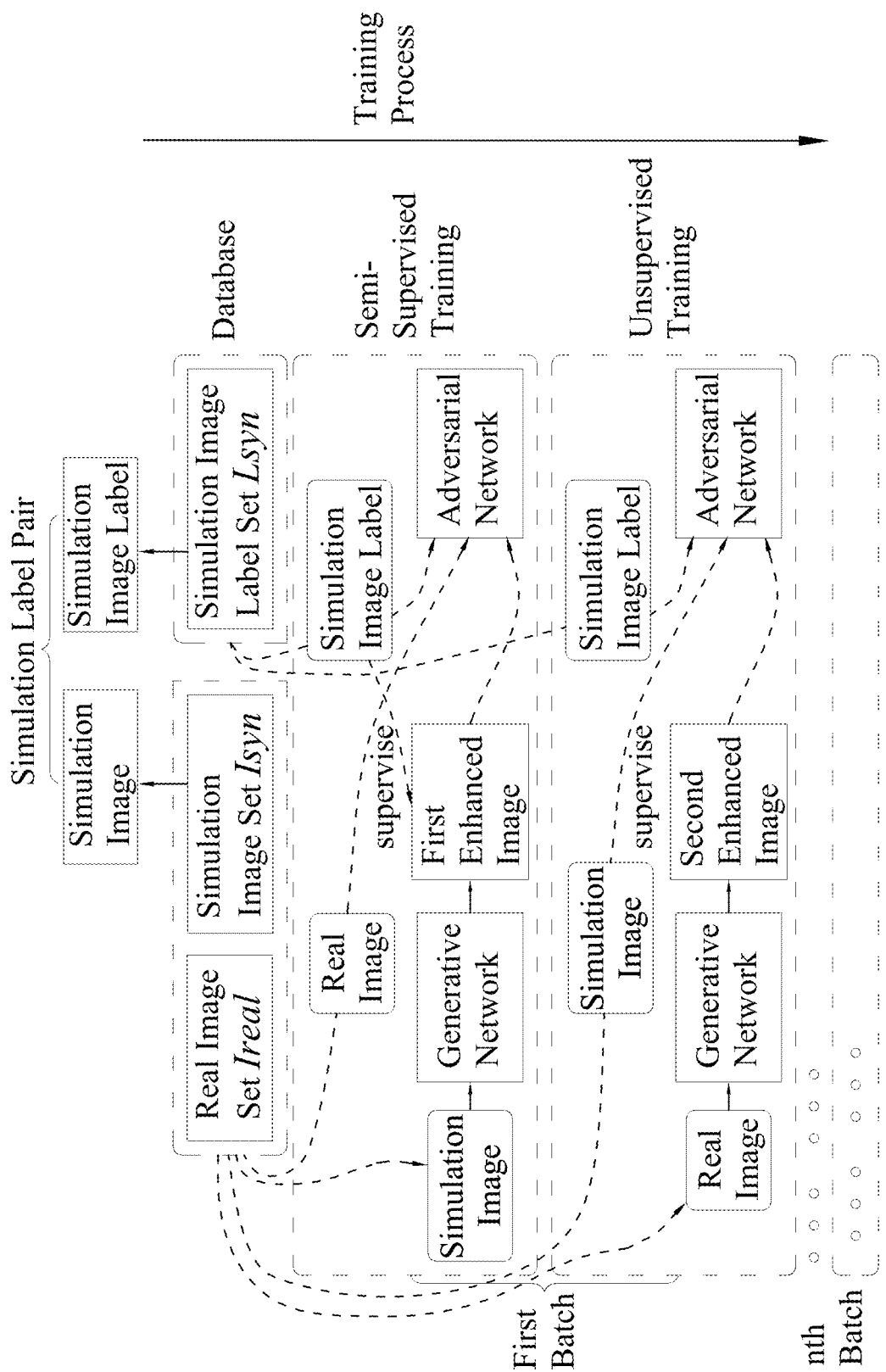
FIG. 1 is a flow chart illustrating the training process according to a preferred embodiment of the present invention.
Figure 2:
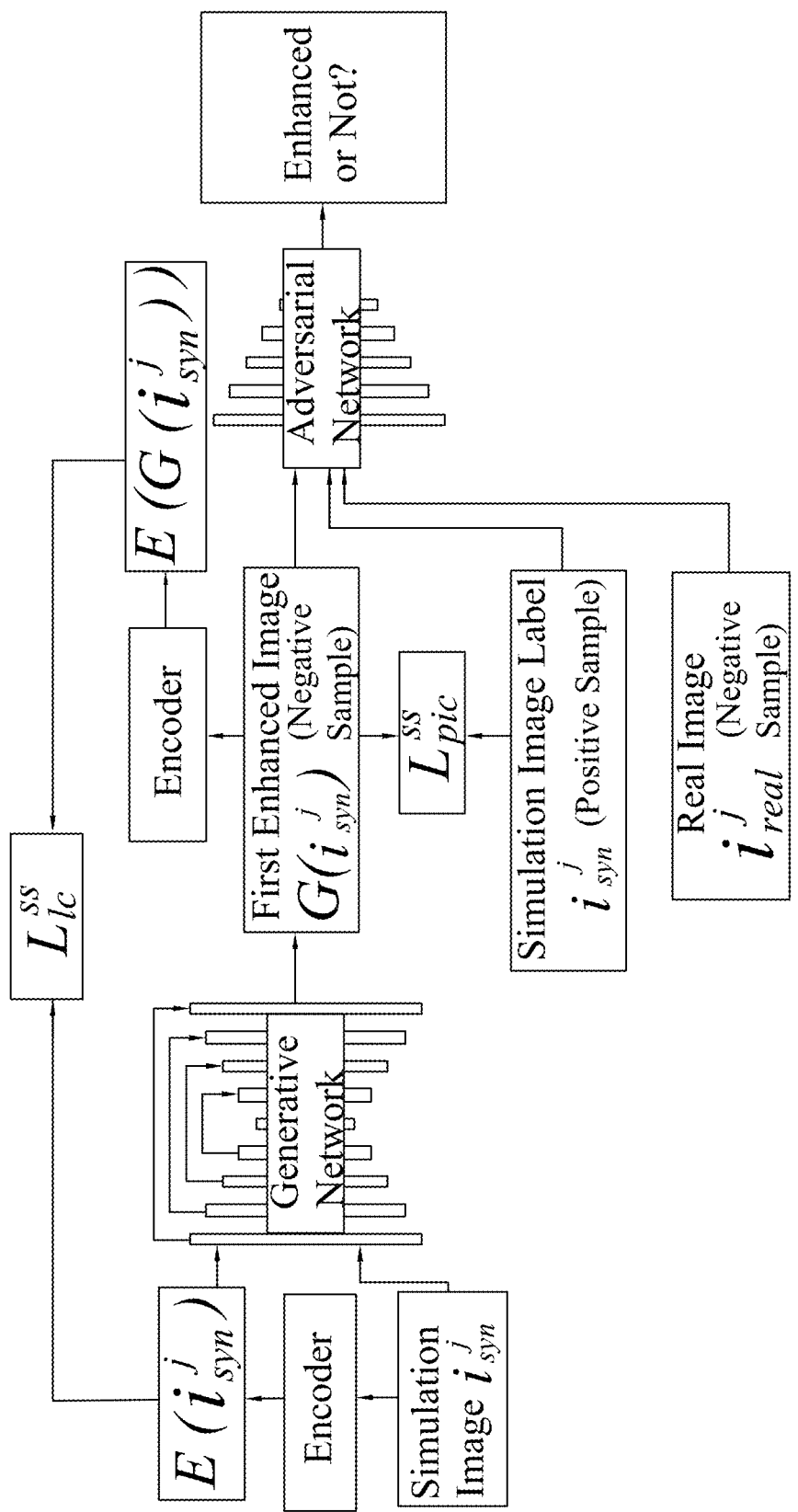
FIG. 2 illustrates an architecture diagram of the semi-supervised enhancement network according to the preferred embodiment of the present invention.
Figure 3:
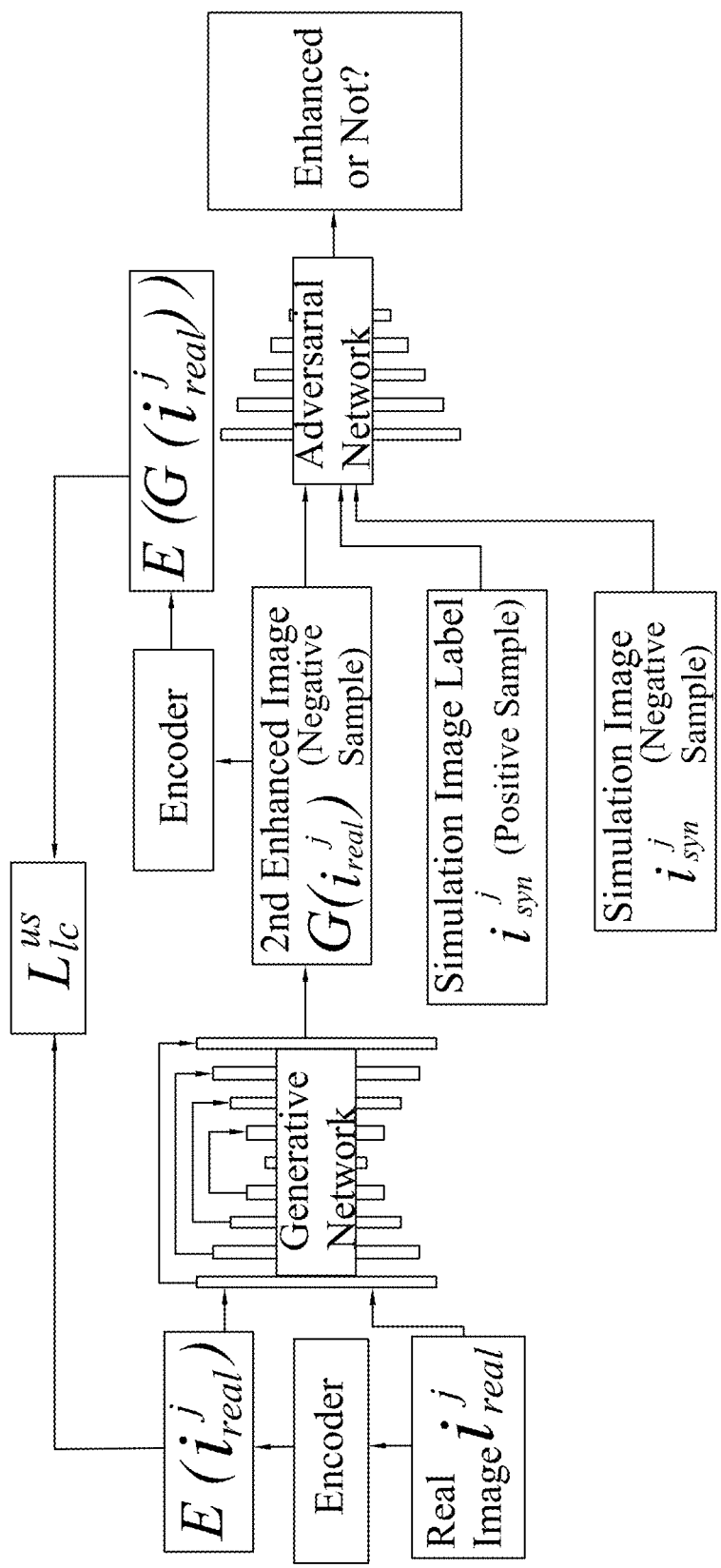
FIG. 3 illustrates an architecture diagram of the unsupervised enhancement network according to the preferred embodiment of the present invention.
Figure 4:
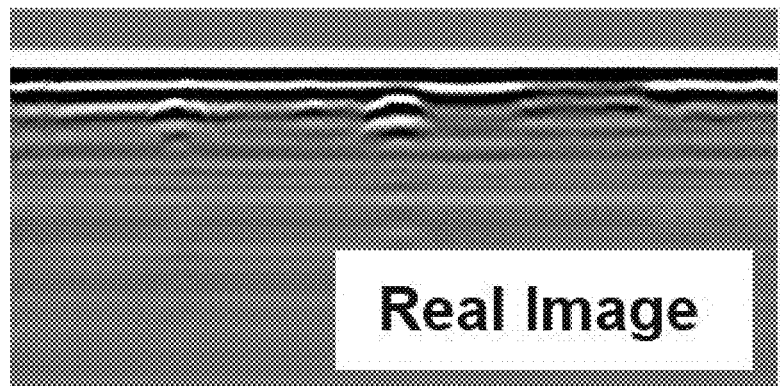
FIG. 4 is a schematic diagram of a real image, a simulation image, and a simulation image label according to the preferred embodiment of the present invention.
Figure 4:
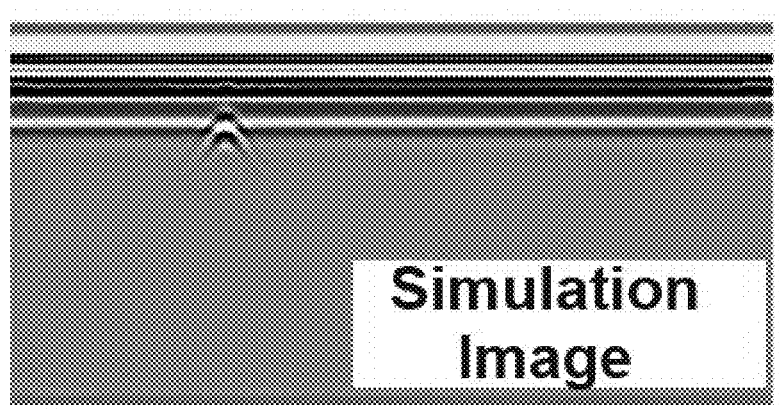
Figure 4:
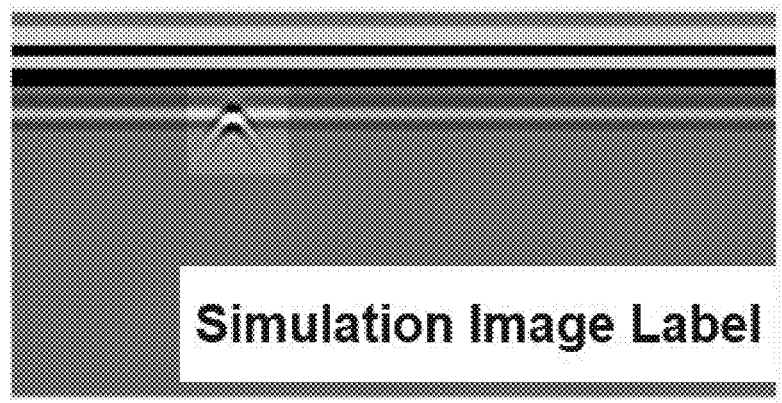

The present invention will be further described below in conjunction with the accompanying drawings.

Preferred Embodiment 1: Referring to FIG. 1 to FIG. 4, a method of enhancing an abnormal area of a ground-penetrating radar image based on hybrid-supervised learning comprises the following steps:

(1) Building a dataset for a database or a database:

Acquire a large number of ground penetrating radar real images, and process simulation to generate a large number of simulation images corresponding to the real images. Both the real image and the simulation image comprises one or more abnormal areas. Obtain a simulation image label with enhanced abnormal area by carrying out enhancement of the abnormal area manually for each one of the simulation images, and construct a simulation label pair with the simulation image and the corresponding simulation image label.

The ground penetrating radar real image can be obtained by scanning a road surface with a three-dimensional ground penetrating radar scanner such as a vehicle-mounted ground penetrating radar, or a manual towed ground penetrating radar. The method of the enhancing an abnormal area of a ground-penetrating radar image based on hybrid-supervised learning is processed and executed by a processor and the result in the form of an image is a physical output or is being displayed on a display.

Construct a real image set $I_{real}$ with all the real images, construct a simulation image set $I_{syn}$ with all the simulation images, and construct a simulation image label set $L_{syn}$ with all the simulation image labels. Therefore the database with the real image set, the simulation image set and the simulation image label set is built.

(2) Constructing a hybrid-supervised double-loop enhancement network:

The hybrid-supervised double-loop enhancement network adopts a generative adversarial network, which comprises a generative network and an adversarial network.

(3) Training the hybrid-supervised double-loop enhancement network:

(31) Collect one batch of samples from the database, which includes N number of real images, N number of simulation images, and N number of simulation image labels corresponding to the simulation images.

(32) Processing semi-supervised training with the samples from this batch:

Input the N number of simulation images, and for each simulation image, extract its latent code, and send the latent code with its corresponding simulation image together to the generative network to obtain a first enhanced image.

Then, input the N number of real images and the N number of first enhanced images as negative samples, and the N number of simulation image labels as positive samples to the adversarial network, which will output the binary classification judgment results of whether the images are enhanced or not for each of the input samples respectively. There is a total of 3N number of judgment results.

Calculate a loss function $L^{ss}$ of the semi-supervised training. By using a back propagation algorithm and process through $L^{ss}$, network weight parameters during the semi-supervised training are updated.

(33) Processing unsupervised training with the samples from this batch:

Input the N number of real images, and for each real image, extract its latent code and send its latent code together with the corresponding real image to the generative network to obtain a second enhanced image.

Then input the N number of second enhanced images and the N number of simulation images as negative samples, and the N number of simulation image labels as positive samples to the adversarial network through which the binary classification judgment results of whether the images are enhanced for each of the input samples are output respectively. There is a total of 3N number of judgment results.

Calculate a loss function $L^{ss}$ of unsupervised training. By using a back propagation algorithm and processing through $L^{us}$, network weight parameters during the unsupervised training are updated.

(34) Sequentially collecting samples by batches from the database, repeating steps (32)-(33), and obtaining a trained model.

(4) Obtaining and inputting a real radar image having an abnormal area that needs to be enhanced into the model obtained in step (34), processing through the generative network to output an abnormal area-enhanced image.

Embodiment 2: Referring to FIG. 1 to FIG. 4, based on Embodiment 1, further limitations are provided. According to the present invention, GPR forward modeling to simulate underground abnormal areas of different types and morphological characteristics is utilized to generate the simulation image.

In addition, the loss function of semi-supervised training can directly use the adversarial loss function of the generative adversarial network in semi-supervised training. The preferable way is to use the loss function $L^{ss}$ of the present invention, which takes into account the latent encode loss function, the image loss function, and the adversarial loss function of the generative adversarial network during semi-supervised training. In the step (32), the loss function $L^{ss}$ of the semi-supervised training is calculated by using the following formula:

$$L^{ss} = \lambda_{ss}(L_{pic}^{ss} + L_{lc}^{ss} + L_d^{ss}) \quad (1)$$

In the formula (1), $L_{lc}^{ss}$ refers to the loss function of the latent code during semi-supervised training, $L_{pic}^{ss}$ refers to the image loss function between the simulation image and the first enhanced image, $L_d^{ss}$ refers to the adversarial loss function of the generative adversarial network during the semi-supervised training, as $\lambda_{ss}$ refers to the loss function coefficient during the semi-supervised training.

Similarly, the loss function of unsupervised training can use the adversarial loss function of the generative adversarial network in unsupervised training. The preferable way is to use the loss function $L^{us}$ of unsupervised training in the step (33), which is calculated by using the following formula:

$$L^{us} = \lambda_{us}(L_d^{us} + L_{lc}^{us}) \quad (2)$$

In the formula (2), $L_{lc}^{ss}$ refers to the loss function of the latent code during the unsupervised training, $L_d^{us}$ refers to the adversarial loss function of the generative adversarial network during the unsupervised training, $\lambda_{us}$ refers to the loss function coefficient during the unsupervised training.

According to this embodiment, the specific formulas for $L_{pic}^{ss}$, $L_{lc}^{ss}$, $L_d^{ss}$, $L_d^{us}$, $L_{lc}^{ss}$ are respectively provided.

$$L_{lc}^{ss} = \frac{1}{N}\sum_{j \in N} E(i_{syn}^j) \log \frac{E(i_{syn}^j)}{E(G(i_{syn}^j))} \quad (3)$$

$$L_{pic}^{ss} = \frac{1}{N}\sum_{j \in N} \left| l_{syn}^{ij} - G(i_{syn}^j) \right| \quad (4)$$

$$L_d^{ss} = \frac{1}{N}\sum_{j \in N} \left[(0 - D(i_{real}^j))^2 + (0 - D(G(i_{syn}^j)))^2 + (1 - D(l_{syn}^{ij}))^2\right] \quad (5)$$

$$L_{lc}^{us} = \frac{1}{N}\sum_{j \in N} E(i_{real}^j) \log \frac{E(i_{real}^j)}{E(G(i_{real}^j))} \quad (6)$$

$$L_d^{us} = \frac{1}{N}\sum_{j \in N} \left[(0 - D(i_{syn}^j))^2 + (0 - D(G(i_{real}^j)))^2 + (1 - D(l_{syn}^{ij}))^2\right] \quad (7)$$

In the formula (3), $i_{syn}^j$ refers to the j-th number of image of the N number of simulation images, $E(i_{syn}^j)$ refers to the latent code of $i_{syn}^j$ obtained through the encoder, $G(i_{syn}^j)$ refers to the first enhanced image obtained from $E(i_{syn}^j)$ and $i_{syn}^j$ being processed together through the generative network, $E(G(i_{syn}^j))$ refers to the latent code of $G(i_{syn}^j)$ obtained through the encoder, j=1~N.

In the formula (4), $l_{syn}^j$ refers to the j-th number of image label of the N number of simulation image labels.

In the formula (5), $D(\ )$ refers to the adversarial network, $D(i_{real}^j)$, $D(G(i_{syn}^j))$, $D(l_{syn}^j)$ refers to the respective binary classification judgment results of $i_{real}^j$, $G(i_{syn}^j)$, $l_{syn}^j$ obtained through adversarial network.

In the formula (6), $i_{real}^j$ refers to the j-th number of image of the N number of real images, $E(i_{real}^j)$ refers to the latent code of $i_{real}^j$ obtained through the encoder, $G(i_{real}^j)$ refers to the second enhanced image obtained from $E(i_{real}^j)$ and $i_{real}^j$ being processed together through the generative network, $E(G(i_{real}^j))$ real refers to the latent code) of $G(i_{real}^j)$ obtained through the encoder.

In the formula (7), $D(i_{syn}^j)$, $D(G(i_{real}^j))$, $D(l_{real}^j)$ refers to the respective binary classification judgment results of $i_{syn}^j$, $G(i_{real}^j)$, $l_{syn}^j$ obtained through the adversarial network.

Regarding the value of N, during training, each batch contains a total of 3N samples, including N real images, N simulation images, and N simulation image labels corresponding to the simulation images. Assuming N=8, then there are 24 images in a batch.

During specific operations, we can artificially determine the values of $\lambda_{ss}$ and $\lambda_{us}$ based on experience. $\lambda_{ss}$ and $\lambda_{us}$ can indicate the importance of semi-supervised training and unsupervised training. When the semi-supervised training is needed to be strengthened, $\lambda_{ss} > \lambda_{us}$, for example, $\lambda_{ss}=2$, $\lambda_{us}=1$, when the unsupervised training is needed to be strengthened, it is just needed to set $\lambda_{us} > \lambda_{ss}$.

Embodiment 3: Referring to FIG. 1 to FIG. 6, based on Embodiment 1, we have conducted a specific simulation experiment as follows.

Regarding step (1) constructing the dataset:

In order to quantitatively study the saliency enhancement method of abnormal areas in GPR images, we use simulation images to construct a set of simulation image set $I_{syn}$. Moreover, in order to qualitatively study the image enhancement performance of the abnormal area saliency enhancement method in ground-penetrating radar images under real environments, a set of real images set $I_{real}$ is also constructed. The composition of the data set is shown in Table 1: the real image set $I_{real}$ contains 1898 real GPR images, including 1609 in training sets and 289 in validation sets; and 2354 simulation label pairs, including simulation images and corresponding simulation image labels. All are used for training.

In the simulation image set $I_{syn}$, the simulation images are split into three disjoint parts A, B and C, wherein the training set contains 1000 unlabeled part A (1000 images) and 1000 label pairs part B (1000×2 images), while the validation set contains 354 label.pairs part C (352×2 images).

TABLE 1

Ground penetrating radar image enhancement data set noise settings

| Dataset | Training Set | Validation Set |
| --- | --- | --- |
| Real image set | 1609 real images, 2354 simulation label pairs | 289 real images |
| Simulation image set | 1000 simulation images A, 1000 simulation label pairs B | 354 simulation label pairs C |

For step (2), constructing a hybrid-supervised double-loop enhancement network:

The hybrid supervised double-loop enhancement network uses a generative adversarial network, which includes a generative network and an adversarial network, therefore the U-Net is used as the generative network in the network architecture, which contains an encoder-decoder architecture with a symmetric short-circuit link structure. This architecture achieves excellent results in image prediction tasks when there is a spatial correspondence between input and output pairs. For the adversarial network, we use the same PatchGAN discriminant network of two different scales as BicycleGAN. The purpose is to output the abnormal area judgement result of whether the images of two different scale of the generated image are enhanced. The output is 1 when enhanced, 0 otherwise. The image sizes of the two different scale are 70×70 and 140×140 respectively. For encoder E, since the task of the encoder is similar to feature extraction work, we use ResNet, and the loss function also uses MAE instead of cross-entropy loss. When feeding latent codes into the generative network, we maintain BicycleGAN's input addition method, which is to convert latent codes into H×W×z tensors and concatenate them with H×W×3 input images. H and W are the height and width of the image respectively, and z is the number of channels of latent code.

Regarding the training in step (3), in order to evaluate the performance of each model, this part uses the Pytorch framework to implement all experiments, and carries out training and verification on the Ground-penetrating radar abnormal area saliency enhancement dataset. When training the hybrid-supervised double-loop enhancement network, the training images are randomly cropped to a size of 512×256, and the batch size is set to 8 real images, 8 simulation images, and 8 simulation image labels as one batch. The learning rate of the ADAM optimizer is set to 0.0003 and remains constant during training. The training process lasts for 10 epochs to allow the model to fully converge for extracting rich latent feature information. The latent code dimension used in the dataset is lantentdim=1024.

Regarding step (4), in order to illustrate the effect of the method of the present invention, two real radar images that require abnormal area enhancement are selected. The BGAN model, SR GAN model, Pix2Pix model, GAN model, BicycleGAN model, and the model obtained in step (3) of the present invention are used to enhance the abnormal areas respectively. Each model outputs a pair of images after processing abnormal area enhancement. The comparison results are shown in FIG. 5 and FIG. 6.

Figure 5:
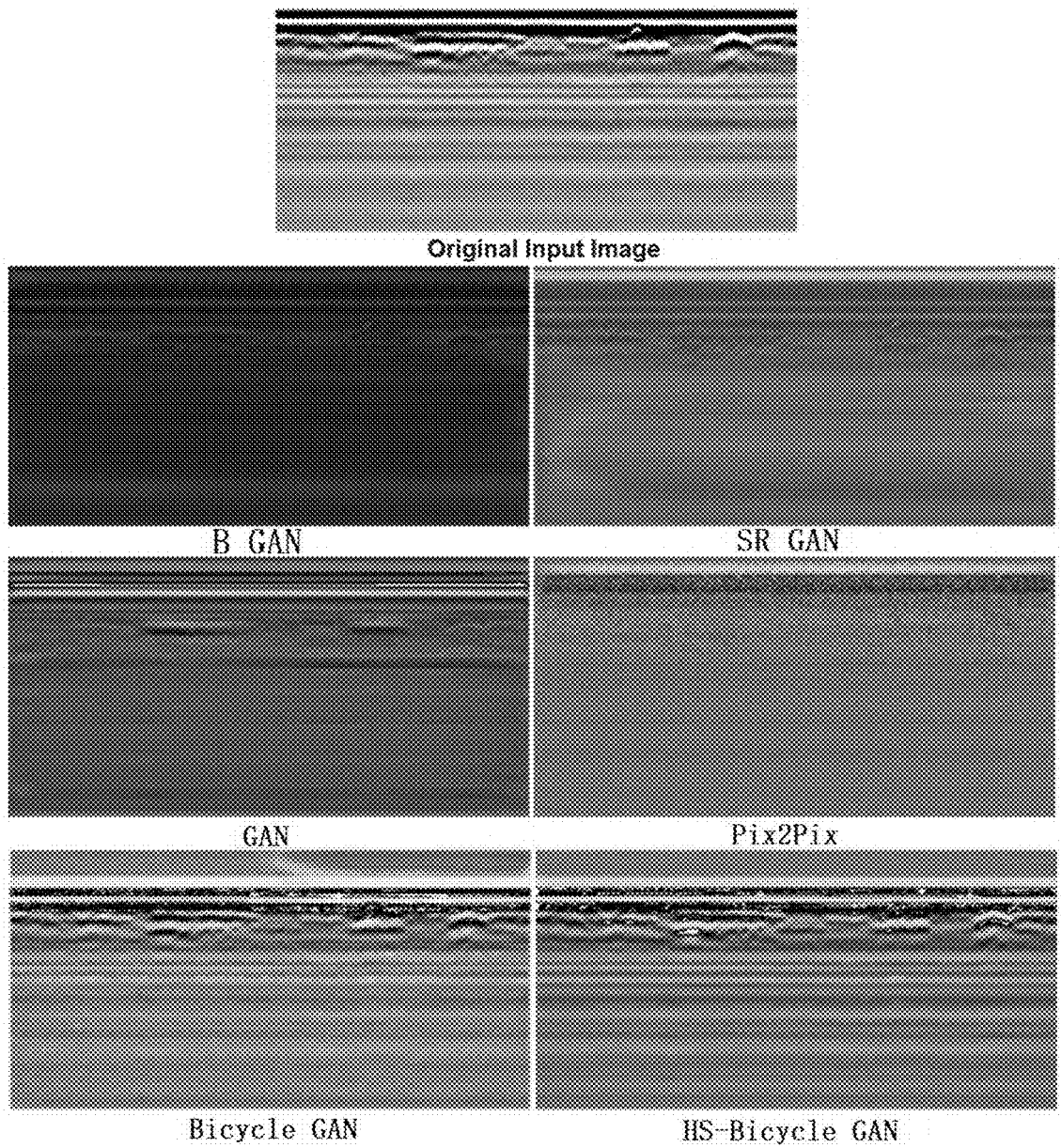
FIG. 5 a comparison diagram of using various methods to enhance the saliency of abnormal areas in an input image in Embodiment 3.

In FIG. 5, the input image is a real radar image that requires abnormal area enhancement. Here the image is called 'original input image'. BGAN, SR GAN, Pix2Pix, GAN, and BicycleGAN respectively represent the output image obtained by processing the original input image through the corresponding model, and HS-BicycleGAN is the output image obtained by processing through the method of the present invention.

Figure 6:
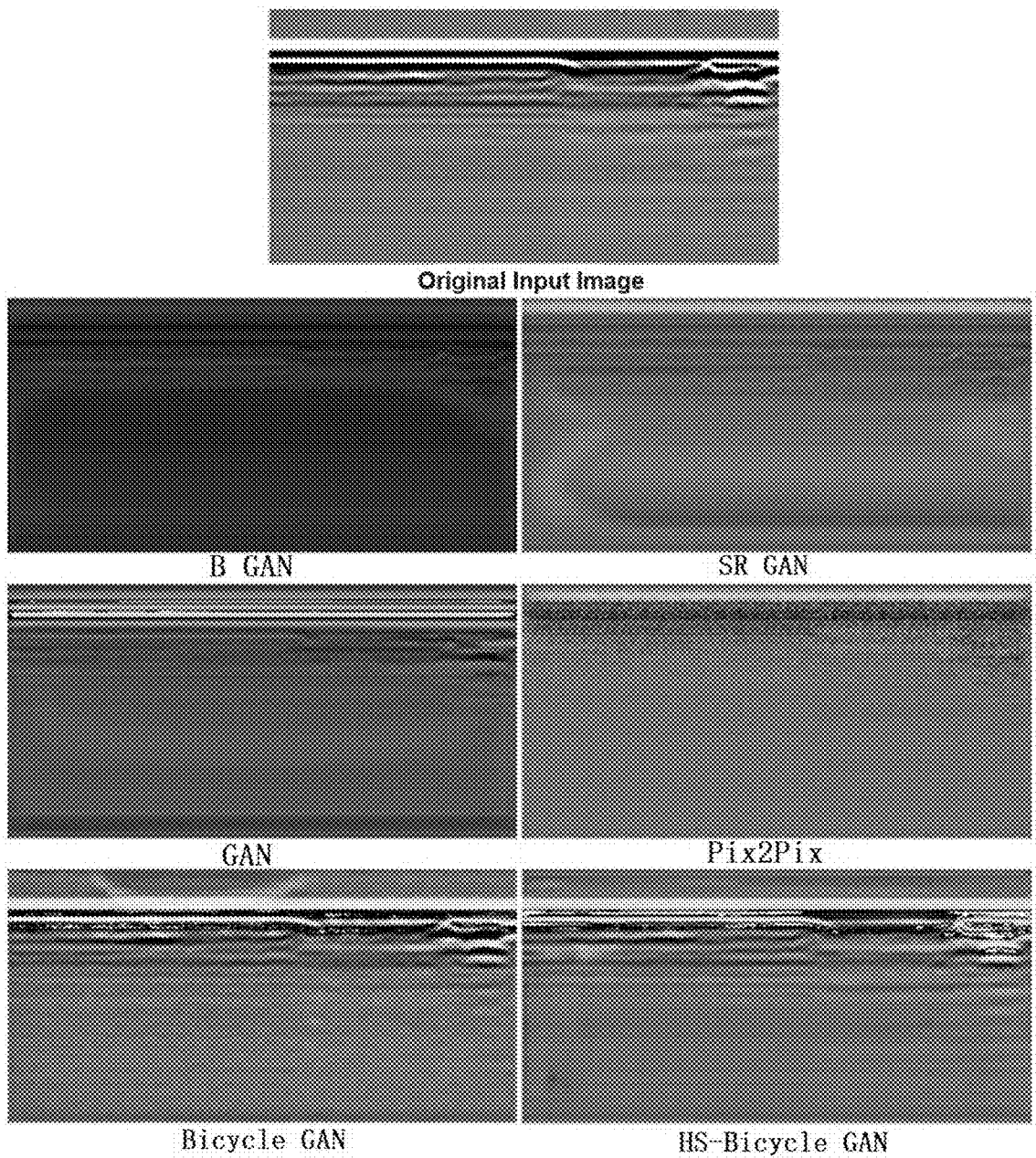
FIG. 6 is a comparison diagram of using various methods to enhance the saliency of abnormal areas in another input image in Embodiment 3.

In FIG. 6, the input image is another real radar image that requires abnormal area enhancement, and the remaining annotations are the same as those of FIG. 5.

As seen from FIG. 5 and FIG. 6, due to the relatively large difference in image quality under real GPR environment, this difference significantly affects the visual effect of enhancement saliency in abnormal areas of the image. Since the original input image is collected under the condition that the uneven medium environment causes large echo interference, the saliency of the image target features is weak and the content details cannot be clearly observed. After the image is enhanced by processing methods BGAN, SRGAN, GAN, Pix2Pix, the image is severely distorted, the abnormal areas are almost completely lost, and the image has low naturalness and contains large noise. This is because the feature differences between simulation image and real image are large, so the resulting model effect of unsupervised training is still not ideal. The image noise after enhancement by BicycleGAN and HS-Bicycle EN methods is significantly reduced, and the abnormal area features are enhanced. Compared with other existing methods, the abnormal area features can be enhanced to a certain extent. However, it is the method of the present invention which can further enhance the saliency of abnormal areas.

In addition, based on the data set in step (1) of this embodiment, we use the BGAN model, SR GAN model, Pix2Pix model, GAN model, BicycleGAN model, and the model obtained in step (3) of the present invention to perform abnormal area enhancement respectively. The SSIM comparison results of image denoising by these six models are obtained, which is shown in Table 2.

TABLE 2

Comparison results of the six models in the ground penetrating radar abnormal area saliency enhancement data set.

| Model | SSIM |
| --- | --- |
| BGAN | 0.36 |
| SR GAN | 0.62 |
| Pix2Pix | 0.75 |
| GAN | 0.77 |
| BicycleGAN | 0.79 |
| Method of the Present Invention | 0.88 |

As can be seen from Table 2, the method of the present invention achieved the best results, with SSIM reaching 0.88. Compared with the BycycleGAN method with suboptimal image visual quality, the SSIM values obtained by the method of the present invention has been improved by 0.09. Compared with other comparative ground penetrating radar image denoising methods, the SSIM values obtained by the method of the present invention have increased by at least 0.22. This proves that the ground penetrating radar image denoising method pf the present invention has achieved advantageous effect in the ground penetrating radar image denoising task and the abnormal area detection task.

The above descriptions are only preferred embodiments of the present invention and are not intended to limit the present invention. Any modifications, equivalent substitutions and improvements made within the spirit and principles of the present invention shall be included within the protection scope of the present invention.

What is claimed is:

1. A method of enhancing an abnormal area of a ground-penetrating radar image based on hybrid-supervised learning, characterized in that, comprising the steps of:
   (1) building a database;
   acquiring a large number of ground penetrating radar real images, and processing simulation to generate a large number of simulation images, wherein both the real images and the simulation images comprises one or more abnormal areas, obtaining a simulation image label by manually enhancing the abnormal area for each of the simulation images, and constructing a simulation label pair with the simulation image and the corresponding simulation image label;

constructing a real image set $I_{real}$ with all the real images, constructing a simulation image set $I_{syn}$ with all the simulation images, and constructing a simulation image label set $L_{syn}$ with all the simulation image labels;

(2) constructing a hybrid-supervised double-loop enhancement network;

wherein the hybrid-supervised double-loop enhancement network adopts a generative adversarial network, which comprises a generative network and an adversarial network;

(3) training the hybrid-supervised double-loop enhancement network;

(31) collecting a batch of samples from the database, wherein the samples comprises N number of real images, N number of simulation images, and N number of simulation image labels corresponding to the simulation images;

(32) processing semi-supervised training with the samples from the batch;

inputting the N number of simulation images, and for each of the simulation images, extracting a latent code and sending the latent code with the simulation image together to the generative network to obtain a first enhanced image;

then inputting the N number of real images and the N number of first enhanced images as negative samples, and the N number of simulation image labels as positive samples to the adversarial network, and outputting binary classification judgment results of whether the images are enhanced or not for each of the inputs respectively, which is a total of 3N number of judgment results;

calculating a loss function $L^{ss}$ of semi-supervised training, using a back propagation algorithm and processing through $L^{ss}$ to update network weight parameters during the semi-supervised training;

(33) processing unsupervised training with the samples from the batch;

inputting the N number of real images, and for each of the real image, extracting a latent code and sending the latent code together with the real image to the generative network to obtain a second enhanced image;

then inputting the N number of second enhanced images and the N number of simulation images as negative samples, and the N number of simulation image labels as positive samples to the adversarial network, and outputting binary classification judgment results of whether the images are enhanced for each of the inputs respectively, which is a total of 3N number of judgment results;

calculating a loss function $L^{us}$ of unsupervised training, using a back propagation algorithm and processing through $L^{us}$ to update network weight parameters during the unsupervised training;

(34) sequentially collecting samples by batches from the database, repeating steps (32)-(33), and obtaining a trained model;

(4) inputting a real radar image with an abnormal area that needs to be enhanced into the model obtained in step (34), processing through the generative network to output an abnormal-area-enhanced image.

2. The method for enhancing an abnormal area of a ground-penetrating radar image based on hybrid supervised learning according to claim 1, characterized in that, the simulation image is generated by using GPR forward modeling to simulate underground abnormal areas of different types and morphological characteristics.

3. The method for enhancing an abnormal area of a ground-penetrating radar image based on hybrid supervised learning according to claim 1, characterized in that, in the step (32), the loss function $L^{ss}$ of the semi-supervised training is calculated by using the following formula:

$$L^{ss} = \lambda_{ss}(L_{pic}^{ss} + L_{lc}^{ss} + L_d^{ss}) \quad (1)$$

wherein in the formula (1), $L_{lc}^{ss}$ refers to the loss function of the latent code during semi-supervised training, $L_{pic}^{ss}$ refers to the image loss function between the simulation image and the first enhanced image, $L_d^{ss}$ refers to the adversarial loss function of the generative adversarial network during the semi-supervised training, $\lambda_{ss}$ refers to the loss function coefficient during the semi-supervised training;

in the step (33), the loss function $L^{us}$ of unsupervised training is calculated by using the following formula:

$$L^{us} = \lambda_{us}(L_d^{us} + L_{lc}^{us}) \quad (2)$$

wherein in the formula (2), $L_{lc}^{ss}$ refers to the loss function of the latent code during the unsupervised training, La refers to the adversarial loss function of the generative adversarial network during the unsupervised training, $\lambda_{us}$ refers to the loss function coefficient during the unsupervised training.

4. The method for enhancing an abnormal area of a ground-penetrating radar image based on hybrid supervised learning according to claim 3, characterized in that, $L_{pic}^{ss}$, $L_{lc}^{ss}$, $L_d^{ss}$, $L_d^{us}$, $L_{lc}^{us}$ are respectively obtained by the following formulas:

$$L_{lc}^{ss} = \frac{1}{N}\sum_{j\in N} E(i_{syn}^j)\log\frac{E(i_{syn}^j)}{E(G(i_{syn}^j))} \quad (3)$$

$$L_{pic}^{ss} = \frac{1}{N}\sum_{j\in N}\left|l_{syn}^j - G(i_{syn}^j)\right| \quad (4)$$

$$L_d^{ss} = \frac{1}{N}\sum_{j\in N}\left[(0 - D(i_{real}^j))^2 + (0 - D(G(i_{syn}^j)))^2 + (1 - D(l_{syn}^j))^2\right] \quad (5)$$

wherein in the formula (3), $i_{syn}^j$ refers to the j-th number of image of the N number of simulation images, $E(i_{syn}^j)$ refers to the latent code of $i_{syn}^j$ obtained through the encoder, $G(i_{syn}^j)$ refers to the first enhanced image obtained from $E(i_{syn}^j)$ and $i_{syn}^j$ being processed together through the generative network, $E(G(i_{syn}^j))$ refers to the latent code of $G(i_{syn}^j)$ obtained through the encoder, j=1~N;

in the formula (4), $l_{syn}^j$ refers to the j-th number of image of the N number of simulation image labels;

in the formula (5), D( ) refers to the adversarial network, $D(i_{real}^j)$, $D(G(i_{syn}^j))$, $D(l_{syn}^j)$ refers to the respective binary judgment results of $i_{real}^j$, $G(i_{syn}^j)$, $l_{syn}^j$ obtained through adversarial network;

$$L_{lc}^{us} = \frac{1}{N}\sum_{j\in N} E(i_{real}^j)\log\frac{E(i_{real}^j)}{E(G(i_{real}^j))} \quad (6)$$

$$L_d^{us} = \frac{1}{N}\sum_{j\in N}\left[(0 - D(i_{syn}^j))^2 + (0 - D(G(i_{real}^j)))^2 + (1 - D(l_{syn}^j))^2\right] \quad (7)$$

in the formula (6), $i_{real}^j$ refers to the j-th number of image of the N number of real images, $E(i_{real}^j)$ refers to the latent code of $i_{real}^j$ obtained through the encoder, $G(i_{real}^j)$ refers to the second enhanced image obtained from $E(i_{real}^j)$ and $i_{real}^j$ being processed together through the generative network, $E(G(i_{real}^j))$ refers to the latent code of $G(i_{real}^j)$ obtained through the encoder;

in the formula (7), $D(i_{syn}^j)$, $D(G(i_{real}^j))$, $D(l_{syn}^j)$ refers to the respective binary judgment results of $i_{syn}^j$, $G(i_{real}^j)$, $l_{syn}^j$ obtained through adversarial network.

* * * * *